Dec. 6, 1955  D. JACKSON  2,725,783
SUPPORTS FOR CAMERAS, PARTICULARLY TELEVISION CAMERAS
Filed Dec. 8, 1951  2 Sheets-Sheet 1

Inventor
DONALD JACKSON
By
Emery, Holcombe & Blair
Attorney

Dec. 6, 1955  D. JACKSON  2,725,783
SUPPORTS FOR CAMERAS, PARTICULARLY TELEVISION CAMERAS
Filed Dec. 8, 1951  2 Sheets-Sheet 2
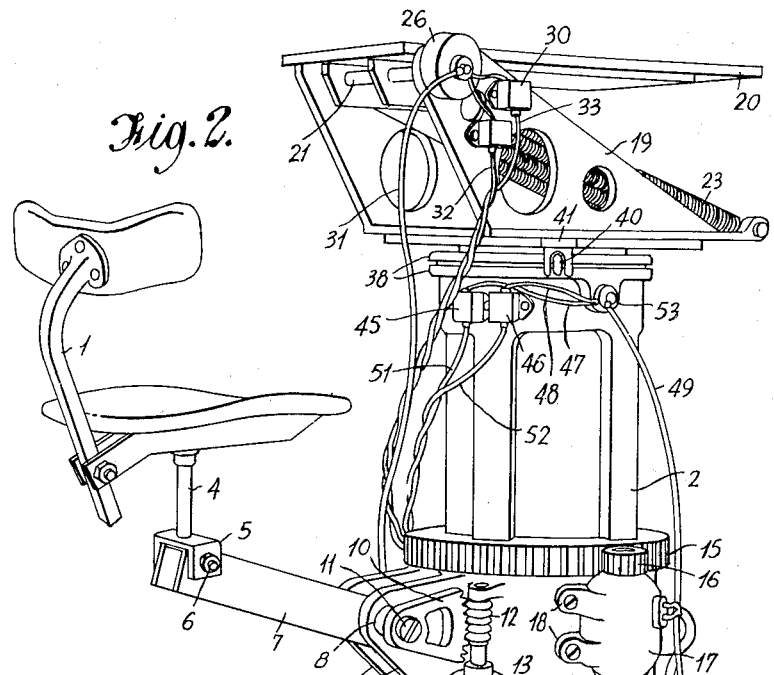
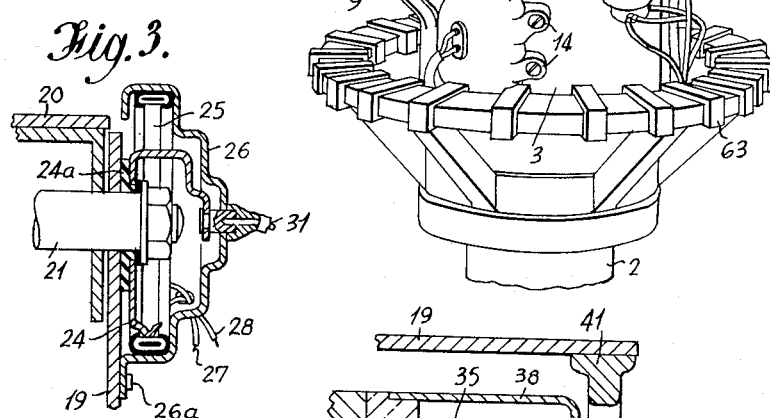
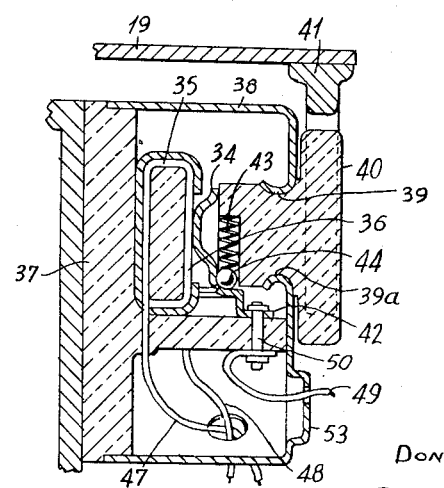
Inventor
DONALD JACKSON
By Emery Holcombe & Blair
Attorney ered Dec. 6, 1955

2,725,783

SUPPORTS FOR CAMERAS, PARTICULARLY TELEVISION CAMERAS

Donald Jackson, Cambridge, England, assignor to Pye Limited, Cambridge, England, a British company Application December 8, 1951, Serial No. 260,671

9 Claims. (Cl. 88—16)

The present invention relates to supports for cameras, particularly television cameras, of the kind in which the support also carries a seat for the camera operator. The support may, for example, be in the form of a wheeled dolly, or a crane or boom, which carries the operator's seat so that it moves with the dolly or crane and the camera carried thereby.

The present invention consists in a camera support of the kind referred to, wherein the support carries, or is provided with means for carrying, the camera in such a manner that it can be swung about a vertical axis and/or a horizontal axis for directing or sighting the camera on the scene to be "shot," and wherein the position of the operator's seat relative to the support is adjustable by power means, the operation of which is controlled in dependence upon the movement of the camera or camera carrying means on the support so that the seat moves horizontally and/or vertically to follow the movement of the camera.

From another aspect, the invention consists in a camera support of the kind referred to, wherein the support carries, or is provided with means for carrying, the camera in such a manner that the camera can be swung around about a vertical axis, and wherein power means are provided, which are actuated in accordance with the movement of the camera or the camera carrying means about said vertical axis, for moving the operator's seat in a horizontal direction with respect to the support. The camera or the carrying means therefor may also be mounted for movement about a horizontal axis with respect to the support, in which case further power means are provided, controlled in response to the movement of the camera or the carrying means about said horizontal axis, for shifting the operator's seat in a vertical direction in relation to the support.

The camera or the carrying means therefor is preferably mounted for both horizontal and vertical swinging movement on the support under direct hand operation. Preferably springs or equivalent counterbalance means are provided for counterbalancing the weight of the camera in the different positions into which the camera may be moved, so that hand adjustment of the camera can be easily effected by the operator. The operator thus has a very quick hand control for sighting the camera on the scene to be "shot," and the follow-up movement of his seat maintains him substantially in the desired relationship with respect to the camera, thus reducing the physical movements of the body which would otherwise be necessary for him to keep his eyes in line with the camera viewfinder. This is particularly important in connection with television cameras where the camera may be continuously in use for long periods of time.

With the arrangement according to the invention operator fatigue is reduced since the operator's seat follows the horizontal and/or vertical movement of the camera and the operator is constantly being moved into the most convenient operating position in relation to the camera; if any "shot" is held for a few seconds the operator's seat will finally stop in this most convenient position.

The seat may be moved both horizontally and vertically by means of separate electric motors which may be started, stopped or reversed in accordance with the movements of the camera on the support through any convenient remote control arrangement.

Some camera mountings are known in which tilting the camera makes no substantial change in the height of the viewfinder and, with such arrangements, vertical adjustment of the operator's seat may be unnecessary so that only horizontal movement of the seat to follow the swinging of the camera about the vertical axis need be provided.

Reference will now be made to the accompanying drawings, which show, by way of example, the invention arranged to give both horizontal and vertical movement to the operator's seat and in which:

Fig. 2 is a perspective view of the upper portion oly of the assembly to a larger scale than Fig. 1 to show the operative parts of the invention more clearly.

Fig. 3 shows a section through the means employed in the specific embodiment to effect control in the vertical direction, Fig. 4 shows a section through the means employed in the specific embodiment to effect control in the horizontal direction.

Figure 1:
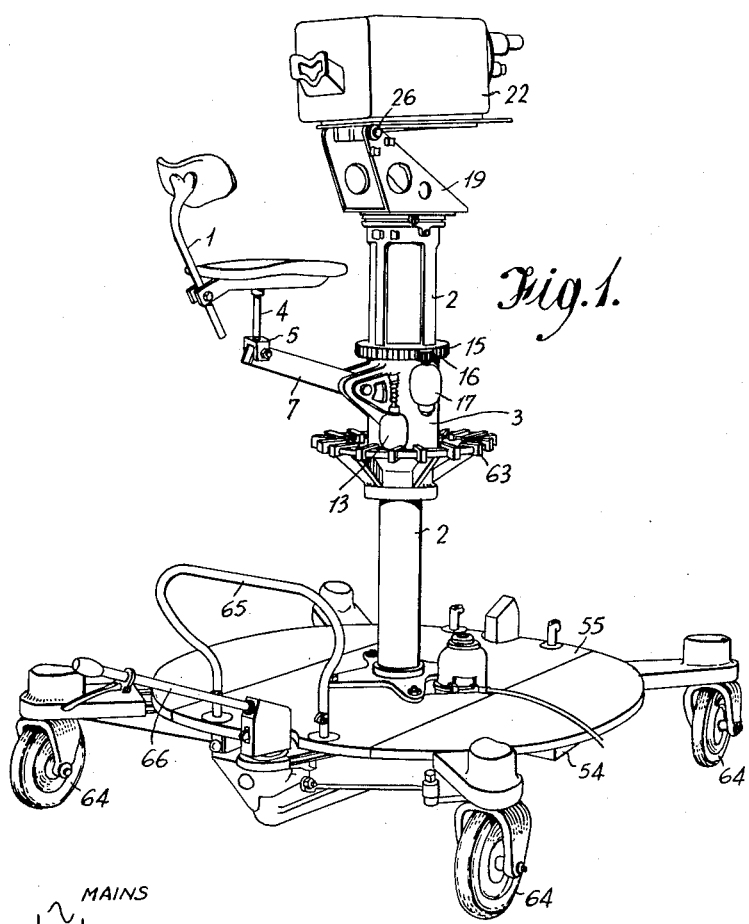
Fig. 1 is a perspective view of the whole assembly, but omitting certain details for the sake of clarity.

Referring to the drawings, the operator's seat 1 is carried from a vertical pillar 2 by means of a collar 3 that surrounds the pillar. The operator's seat itself is carried by a stem 4 that terminates in a U-bracket 5 bolted by means of bolts 6 to a member 7 carried by a shaft 8 in a two-part trunnion bracket 9 that is carried on the collar 3. The shaft 8 carries a geared quadrant 10 bolted to it by bolt 11, the quadrant meshing with a wormwheel 12 on the driven shaft of an electric motor 13 carried on the collar 3 by means of bolts 14.

The uppermost portion of the pillar 2 carries fast to it a toothed gear wheel 15 meshing with a pinion 16 driven by means of an electric motor 17 also carried on the collar 3 by means of bolts 18.

It will thus be seen that when the motor 13 is driven, it will rotate the worm wheel 12 to move quadrant 10 thereby causing the member 7 to move about the trunnion pivot whereby the operator's seat 1 is moved in a substantially vertical direction. In a similar manner, when the motor 17 is driven it will rotate the pinion 16 causing the collar 3 to walk round the pillar 2 carrying the seat 1 and the two motors by virtue of the engagement of pinion 16 with the gear wheel 15 fast on the pillar 2.

Mounted above the pillar 2 is a camera support 19 which is mounted so that it may be panned about the vertical axis of the pillar 2. The support 19 is in two sections, the upper portion thereof 20 being fixed to a shaft 21 and pivoting in the lower portion so that the camera 22 may be moved in a substantially vertical direction. Counterbalancing springs 23, which form no part of the present invention, may be utilised to maintain the camera 22 at any vertical position without the need of additional clamping arrangements.

As shown more particularly in Fig. 3 a wiper arm 24 is carried by the shaft 21 from which it is insulated by washer 24a and this wiper arm makes contact with the track 25 of a potentiometer which is secured to but insulated from a case 26 fixed to the camera support 19 by screws 26a. Thus on tilting the camera and its immediate support 20, the wiper arm 19 moves over the track of the potentiometer which has electrical connections 27, 28 connected to condensers 29 and 30, the wiper arm 24 having an electrical connection 31 which gives an output representing the position of the wiper arm 24 on the track 25. Connections 32 and 33 go to mains. The circuit arrangements will be described in conjunction with Fig. 5.

In an analogous manner and shown more particularly in Fig. 4, the camera support 19 also carries a wiper 34 adapted to contact the track 36 of a potentiometer winding 35 fixed to the pillar 2. The winding 35 has electrical connections connected to condensers 45 and 46 and the wiper has an electrical connection which gives a voltage representative of the position of the wiper arm 34 on the track 36. This circuit arrangement is also described in conjunction with Fig. 5.

The potentiometer winding 35 is insulated except for track portion 36 contacting the wiper arm 34 and extends in annular fashion around the pillar 2 from which it is further insulated by the annular member 37 of insulating material. The member 37 carries an annular metal supporting ring 38 inwardly flanged at 39, 39a to accommodate the slider 40 of insulating material carried by bracket 41 depending from the camera support 19. The member 37 carries an annular contact ring 42 upon which the wiper arm 34 is pressed by spring and ball arrangement 43, 44 carried by slider 40.

The electrical connections from the winding 35 to the condensers 45 and 46 are indicated at 47 and 48 and the electrical lead to the wiper 34 is shown at 49, connected to the bolt 50 on the annular contact ring 42. The condensers 45 and 46 are connected across the mains by leads 51, 52.

For tidiness, the leads 47 and 48 are taken to a casing 53 located on the lower supporting ring 38 as shown more particularly in Fig. 2.

Figure 5:
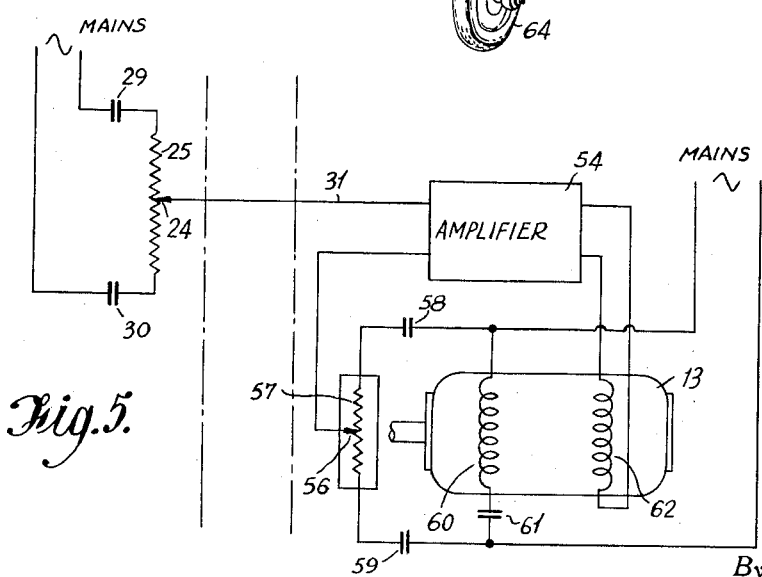
Fig. 5 is a wiring diagram.

Referring now more particularly to Fig. 5 in which a wiring diagram of the motoring arrangements are shown, it should be understood that although the diagram refers to one motor only, in point of fact, each of the motors 13 and 17 has a similar wiring diagram but it is not thought necessary to reproduce both of them. Therefore, the wiring details now given for the one motor are the same for the other motor with the substitution of appropriate reference numerals as will be well understood. We shall assume, therefore, that description of the wiring diagram in connection with the tilting arrangement of potentiometer 25 will be sufficient for a thorough understanding of the invention.

The potentiometer 25 is connected across the mains supply with the interposition of isolating condensers 29, 30. The variable contact 24 is connected by the single conductor 31 to one of the input terminals of an amplifier 54 which may be located beneath the base 55 of the support, shown in Figure 1. The other input terminal of the amplifier 54 is connected to the variable contact 56 of a potentiometer 57 connected across the mains supply with the interposition of isolating condensers 58, 59. This potentiometer 57 is coupled to be driven by the two-phase motor 13 to adjust the setting of the contact 56. One winding 60 of the motor is directly connected across the mains supply with the interposition of an isolating condenser 61 and the other winding 62 of the motor is fed from the output of the amplifier 54. The driving shaft of the motor 13 is also connected to the wormwheel 12, as above described. Although the potentiometer 56, 57 is shown externally of the motor in Figure 5, it is to be understood that this is purely for the sake of convenience and clarity: in fact, the potentiometer is arranged within the casing of the motor and therefore this figure must be considered as being schematic.

Since the supply voltages are alternating, movement of the camera-support-operated potentiometer 25 will cause current to flow through the motor winding 62 which is fed from the amplifier 54 to rotate the motor in one direction or the other depending upon the direction in which the potentiometer is moved. The motor revolves until the potentiometer 57 driven thereby balances the bridge-circuit forming the input of the amplifier, when the motor stops. This is to say, the system is a remote follow-up system in which the camera support 19, 20 is moved by tilting the camera 22 and as soon as this movement is commenced, the bridge-circuit having as input the two potentiometer windings 25 and 57 becomes unbalanced whereby an output is obtained from the amplifier to cause the motor 13 to rotate until such time as the moving contact 56 of the motor-driven potentiometer moves to a point on the track 57 such that the voltage output from that potentiometer balances that derived from the potentiometer 25. In this condition, the input circuit is balanced and there is no output from the amplifier so that the motor stops. Thus, tilting of the camera causes operation of motor 13 to cause tilting of the seat 1 and the tilting of the seat 1 follows exactly the movement of the camera support: when the latter is stopped, the tilting of the seat stops and the operator therefore follows the movement of the camera 22.

Similarly, panning of the camera 22 in the horizontal plane causes a similar drive of the motor 17 whereby the collar 3 is moved around the pillar 2 whereby the operator's seat 1 and the operator sitting upon it moves in dependence upon the movement executed by the camera and its support.

Reverting now to the general arrangement shown more particularly in Figure 1, the collar 3 carries a foot-rest 63 which therefore travels round the pillar 2 with the seat 1. The pillar 2 is mounted upon the base 55 and for ease of movement the latter is provided with caster wheels 64 and a towing handle 65. A brake lever 66 is provided to effect movement of braking mechanism associated with the caster wheels 64 but since this forms no part of the present invention, it is not though necessary to describe it here.

Although the control of the operator's seat has been described in conjunction with an unbalanced-bridge follow-up system, it should be understood that any other convenient control means may be employed.

I claim:

1. A camera support, particularly for television or motion picture cameras, comprising a support member, an operator's seat carried by said support member, camera-carrying means mounted on said support member for free manual movement of said camera-carrying means about a vertical axis and a horizontal axis for directing or setting the camera on the scene to be photographed, power means for adjusting the position of the operator's seat relative to said support, and means for controlling the operation of said power means, said control means being connected to said seat and said camera-carrying means so as to cause the power drive to move the seat horizontally and vertically to follow the movement of the camera.

2. A camera support particularly for television or motion picture cameras comprising a support member, camera-carrying means mounted on the support member for free manual pivotal movement to direct the camera, an operator's seat movably mounted on the support member, power means for adjusting the position of the operator's seat relative to the support member in a direction approximately corresponding to said pivotal movement without affecting the position of said camera-carrying means relative to said support member, and means for controlling the operation of said power means, said control means being connected to the camera-carrying means and to the seat so as to cause the power means to drive the seat to follow said pivotal movement of the camera.

3. A camera supporting structure, particularly for a television or motion picture camera, comprising a support, an operator's seat guided by said support for movement about a vertical axis spaced from said seat, a camera-carrying means mounted on said support for movement about said vertical axis independently of said operator's seat and located within manipulating reach of an average person seated on said seat, reversible power means for producing said movement of the operator's seat without affecting the position of the camera relative to said support, and movement and direction control means for controlling the operation of said power means, said control means being connected to said seat and to said camera-carrying means so as to cause said power means, when the camera-carrying means is moved, to move the operator's seat in the same direction of rotation and by approximately the same angle as the camera-carrying means is being moved.

4. A camera supporting structure, particularly for a television or motion picture camera, comprising a support, an operator's seat guided by said support for movement about a horizontal axis, a camera-carrying means mounted on said support for movement about said horizontal axis independently of said operator's seat and located within manipulating reach of an average person seated on said seat, reversible power means for producing such movement of the operator's seat without affecting the position of the camera relative to said support, and movement and direction control means for said reversible power means, said control means being connected to said seat and to said camera-carrying means so as to cause said power means, when the camera-carrying means is moved, to move the operator's seat in the same direction of rotation and by approximately the same angle as the camera-carrying means is being moved.

5. A camera support, particularly for a television or motion picture camera, comprising a support member, camera-carrying means mounted on the support member for free manual movement of the camera relative to the support member about a vertical axis, an operator's seat mounted on the support member for horizontal movement relative to the support member, a power drive for moving the operator's seat relative to the support member, and control means for said power drive connected to said seat and to said camera-carrying means in such manner as to cause the power drive to move the seat horizontally to follow the movement of the camera.

6. A camera support as claimed in claim 5, in which said power drive includes an electric motor having an energising winding and said control means includes an electric circuit, an amplifier in said circuit, an output circuit from said amplifier, including said energising winding, and an input circuit to said amplifier including a bridge circuit comprising a camera-operated potentiometer in one arm and a potentiometer driven by said motor in another arm, whereby the motor driven potentiometer follows the movement of the camera operated potentiometer, the arrangement being such that no output from the amplifier is present when the input is balanced, that is to say, when the position of the motor driven potentiometer agrees with that of the camera operated potentiometer.

7. A camera support as claimed in claim 5, in which said power drive includes a two-phase electric motor and said control means includes an electric circuit, an amplifier in said circuit, an output circuit from said amplifier, including one phase winding of said motor, and an input circuit to said amplifier, including a bridge circuit comprising a camera-operated potentiometer in one arm and a potentiometer driven by said motor in another arm, whereby the motor driven potentiometer follows the movement of the camera operated potentiometer, the arrangement being such that no output from the amplifier is present when the input is balanced, that is to say, when the position of the motor driven potentiometer agrees with that of the camera operated potentiometer.

8. A camera support, particularly for television or motion picture camera, comprising a support member, camera carrying means mounted on the support member for free manual movement of the camera relative to the support member about a horizontal axis, an operator's seat mounted on the support member for vertical movement relative to the support member, a power drive for moving the operator's seat vertically relative to the support member and control means for said power drive connected to said seat and to said camera carrying means in such manner as to cause the power drive to move the seat vertically to follow the movement of the camera.

9. A camera support as claimed in claim 8, comprising a vertical column on a base, a collar on said vertical column and a bracket on said collar for supporting said operator's seat for pivotal movement about a horizontal axis spaced from the seat, said collar carrying said power drive, said power drive comprising an electric motor, a geared quadrant carried by said pivotal support, and a drive worm on said motor for driving said quadrant and thereby moving said operator's seat in an approximately vertical direction.

References Cited in the file of this patent

UNITED STATES PATENTS

| | | |
|---|---|---|
| 1,816,290 | Klimis | July 28, 1931 |
| 1,909,815 | De Florez | May 16, 1933 |
| 2,306,862 | Bown | Dec. 29, 1942 |
| 2,358,105 | Scott-Paine | Sept. 12, 1944 |
| 2,472,944 | Furer et al. | June 14, 1949 |